United States Patent [19]
Tokai et al.

[11] Patent Number: 5,677,617
[45] Date of Patent: Oct. 14, 1997

[54] MICRO POWER SUPPLY DEVICE USING SWITCHING ELEMENT

[75] Inventors: Yoichi Tokai; Toshiro Sato, both of Yokohama, Japan

[73] Assignee: Kabushiki Kaisha Toshiba, Kawasaki, Japan

[21] Appl. No.: 528,014

[22] Filed: Sep. 14, 1995

[30] Foreign Application Priority Data

Sep. 16, 1994 [JP] Japan ................... 6-222244

[51] Int. Cl.$^6$ ................... G05F 1/652
[52] U.S. Cl. ................... 323/222; 363/124
[58] Field of Search ................... 323/222, 224; 363/17, 98, 124; 315/225

[56] References Cited

U.S. PATENT DOCUMENTS

| | | | |
|---|---|---|---|
| 4,720,668 | 1/1988 | Lee et al. | 323/271 |
| 4,841,564 | 6/1989 | Schoofs | 379/413 |
| 5,384,518 | 1/1995 | Kido et al. | 315/225 |

OTHER PUBLICATIONS

T. Sato et al., Planar Inductor for Very Small DC–DC Converters, Intelec'91, Nov. 1991, pp. 709–713.

M. F. Schlecht et al., Comparison of the Square–Wave and Quasi–Resonant Topologies, IEEE Transactions on Power Eelctronics, vol. 3, No. 1, Jan. 1988, pp. 83–92.

*Primary Examiner*—Peter S. Wong
*Assistant Examiner*—Rajnikant B. Patel
*Attorney, Agent, or Firm*—Finnegan, Henderson, Farabow, Garrett & Dunner, L.L.P.

[57] ABSTRACT

A micro power supply device using a switching element includes a lateral MOSFET, an inductor, a rectifier and a controller. The lateral MOSFET PWM-switches the output voltage of the direct-current power supply at a low loss. The rectifier rectifies the output voltage of the direct-current power supply PWM-switched by the lateral MOSFET. The inductor is provided between the direct-current power supply and the lateral MOSFET. The controller supplies a PWM control signal to the gate electrode of the lateral MOSFET in response to the output voltage of the rectifier.

16 Claims, 13 Drawing Sheets

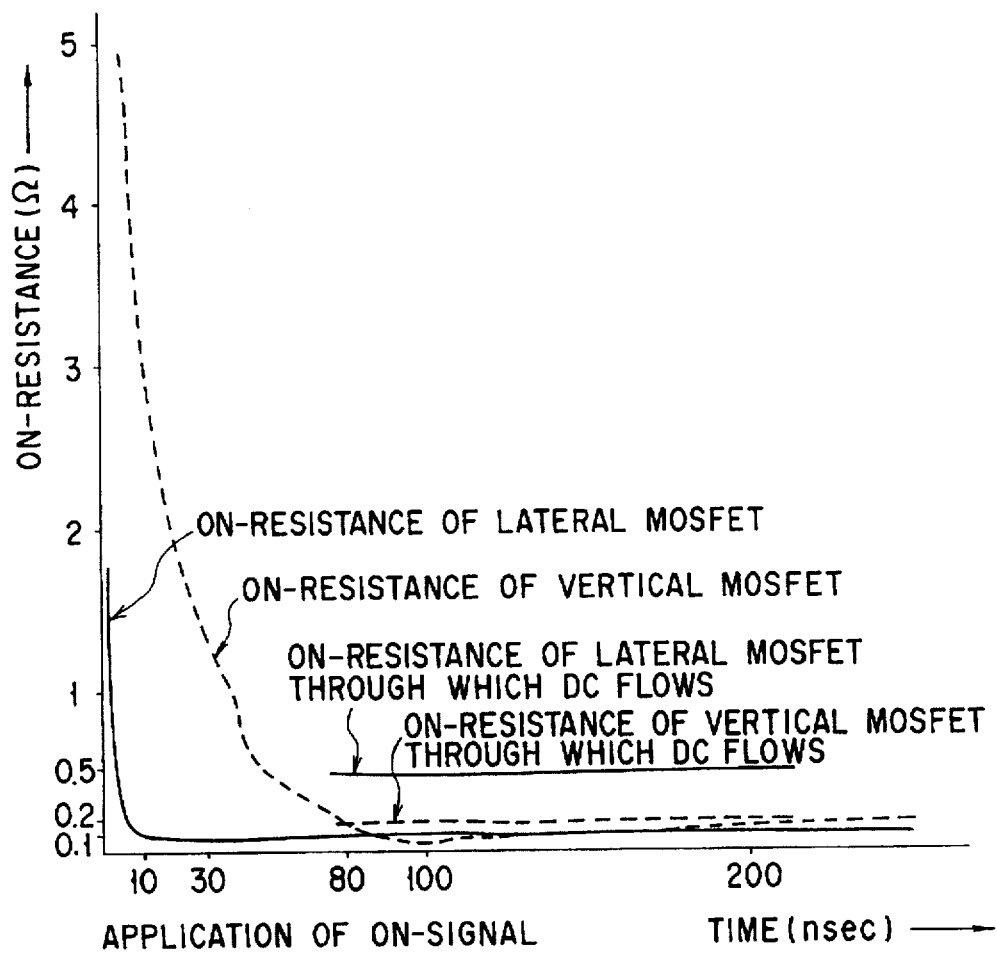
F I G. 1
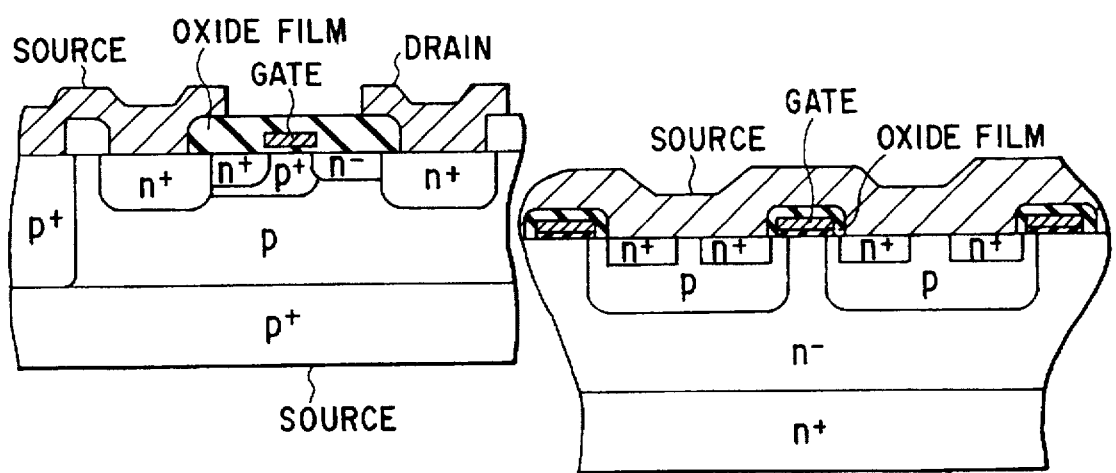
F I G. 2
F I G. 3

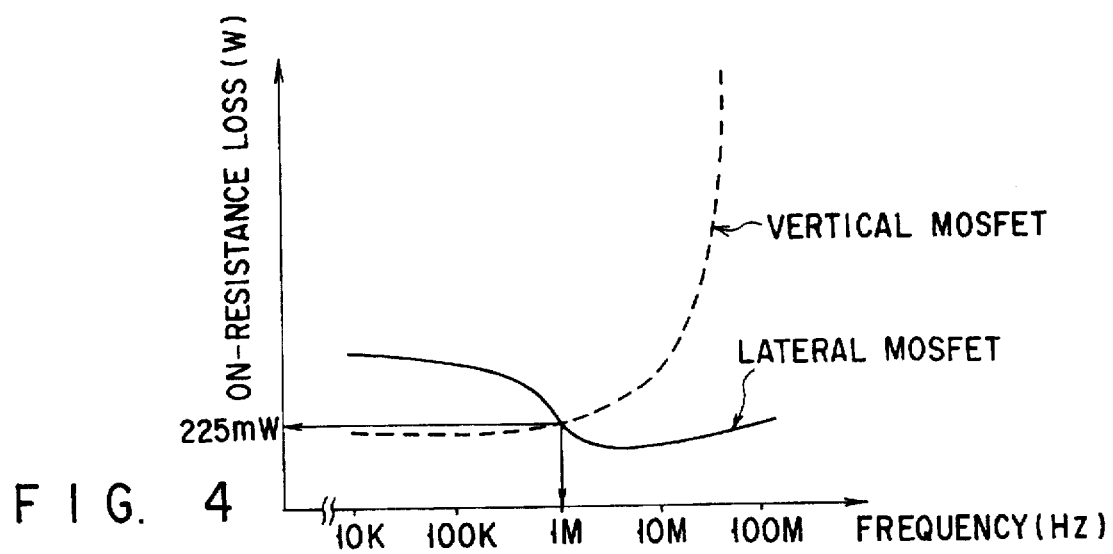
F I G. 4
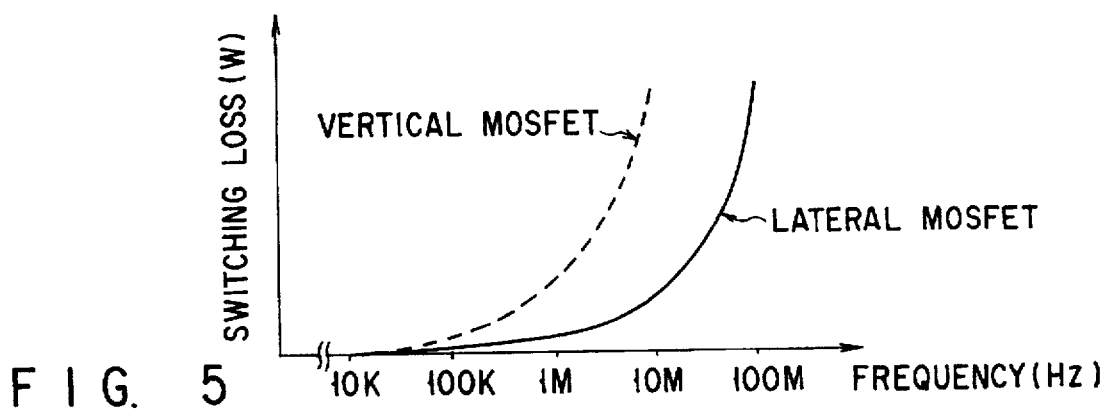
F I G. 5
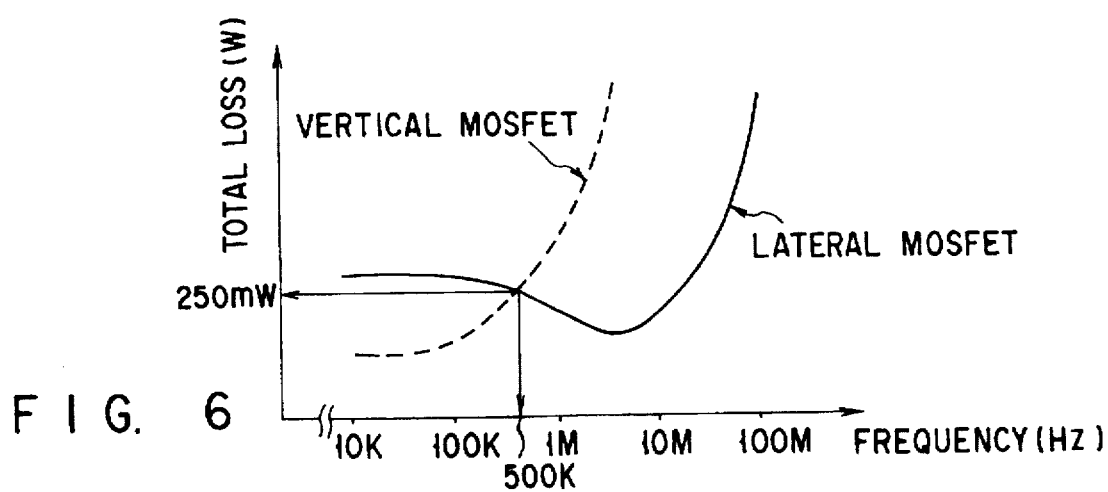
F I G. 6

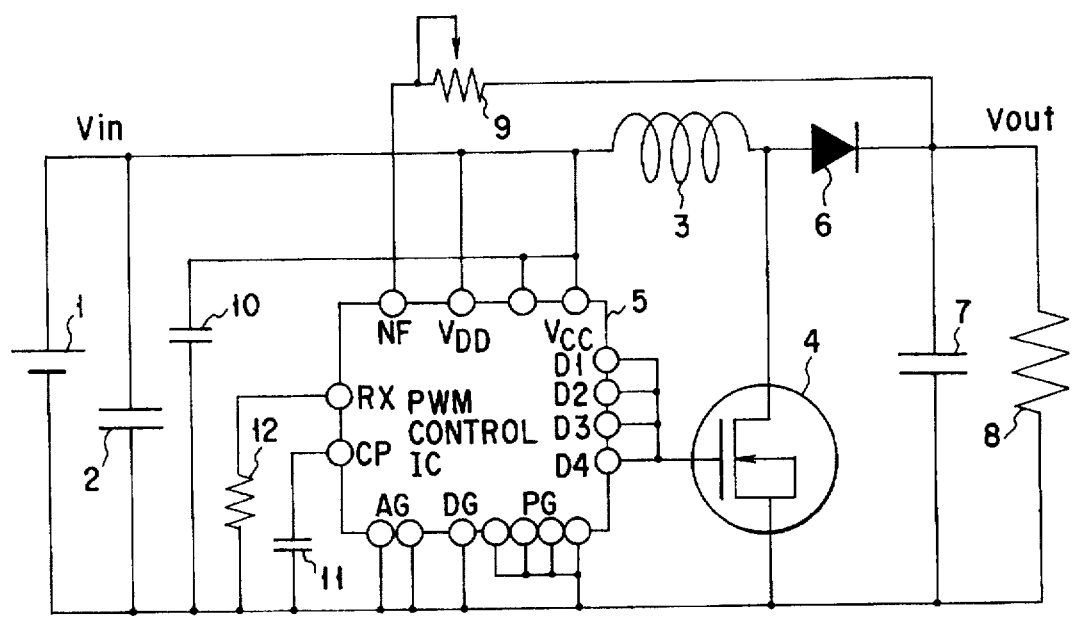
F I G. 7
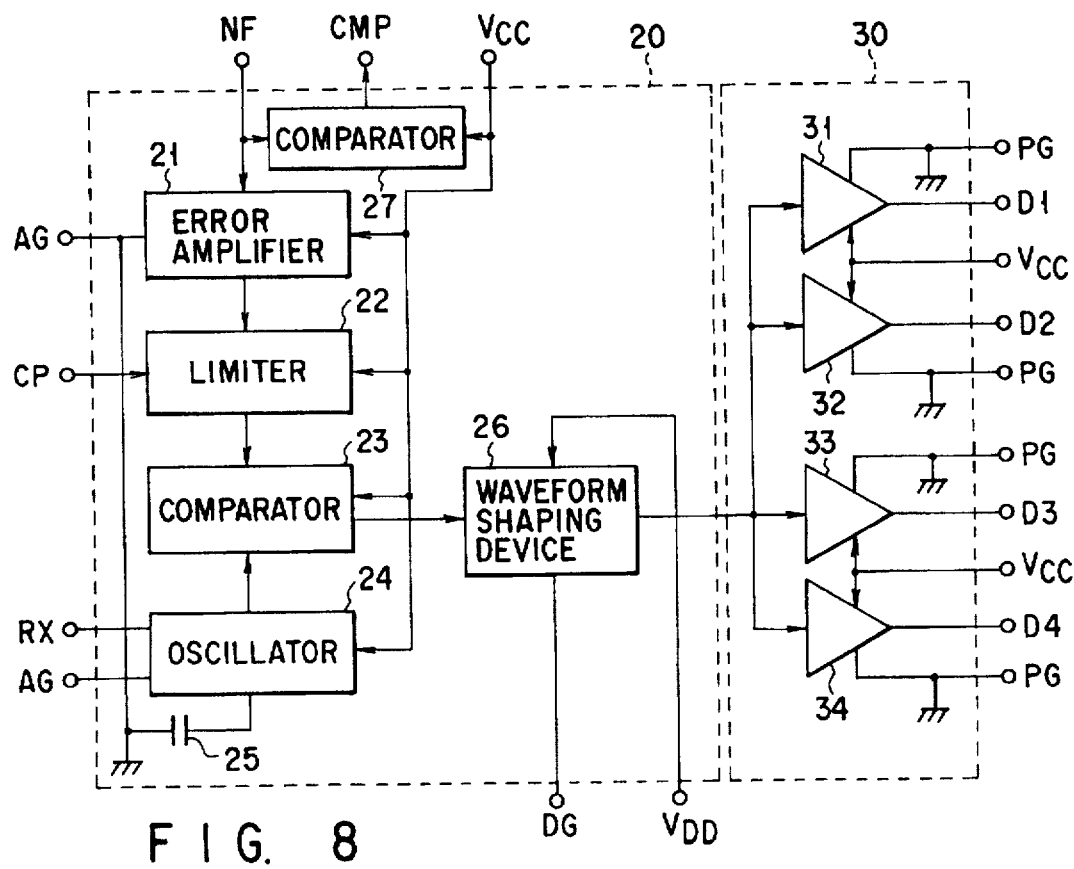
F I G. 8

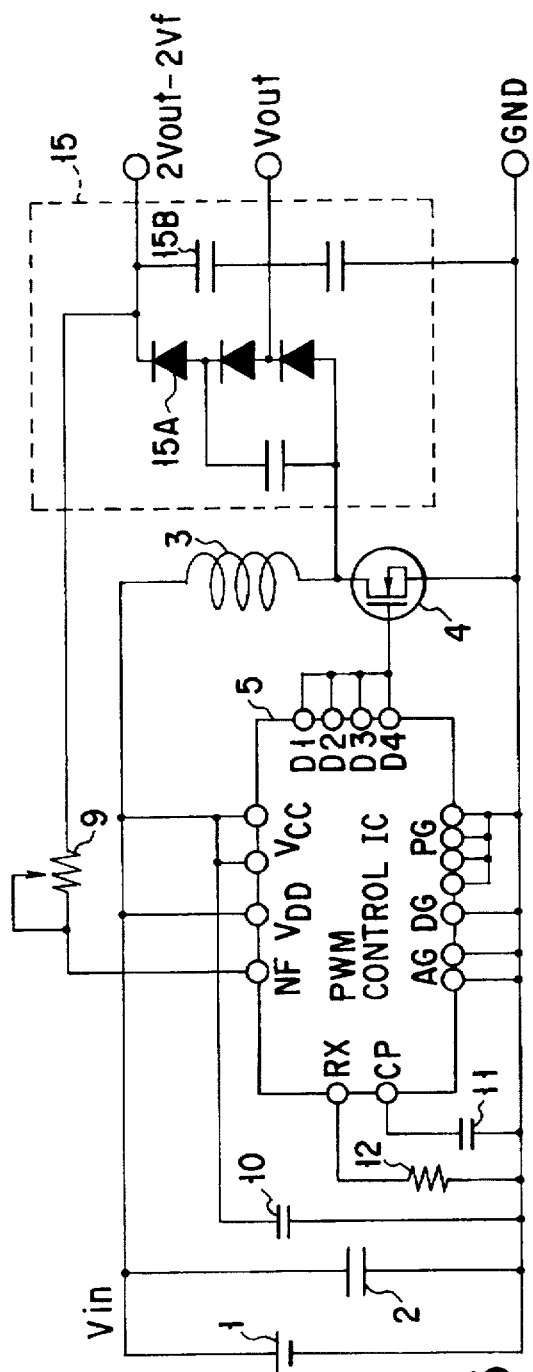
F I G. 15
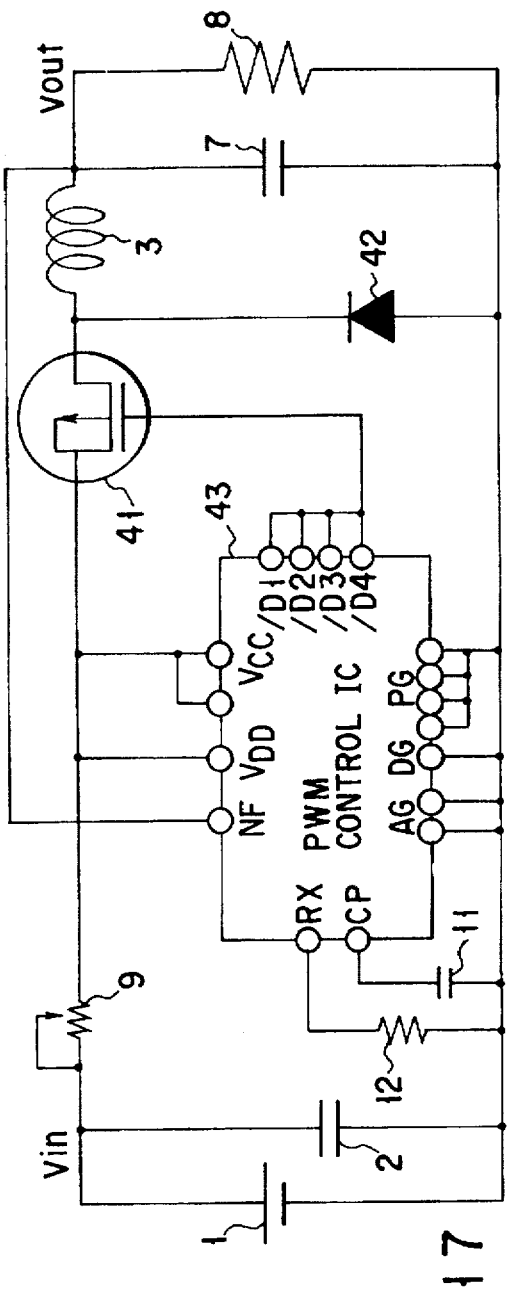
F I G. 17

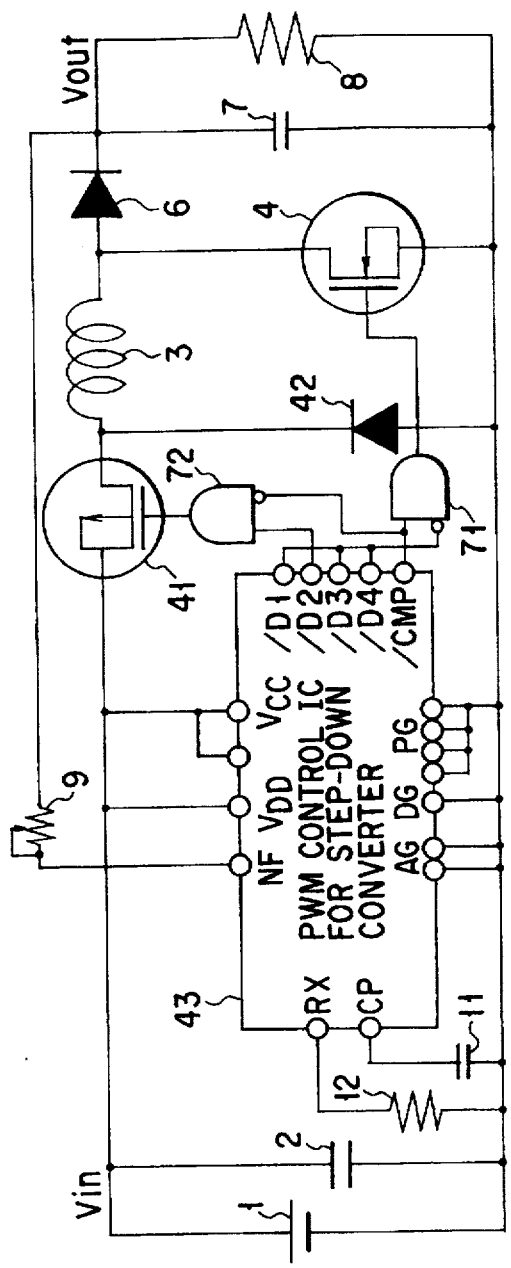
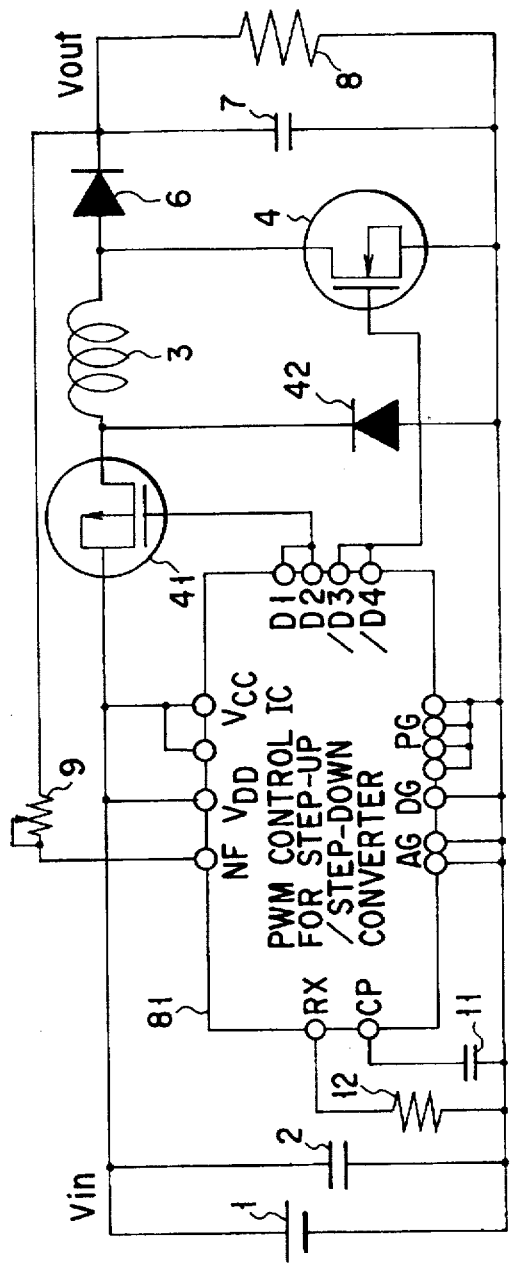
F I G. 21
F I G. 22

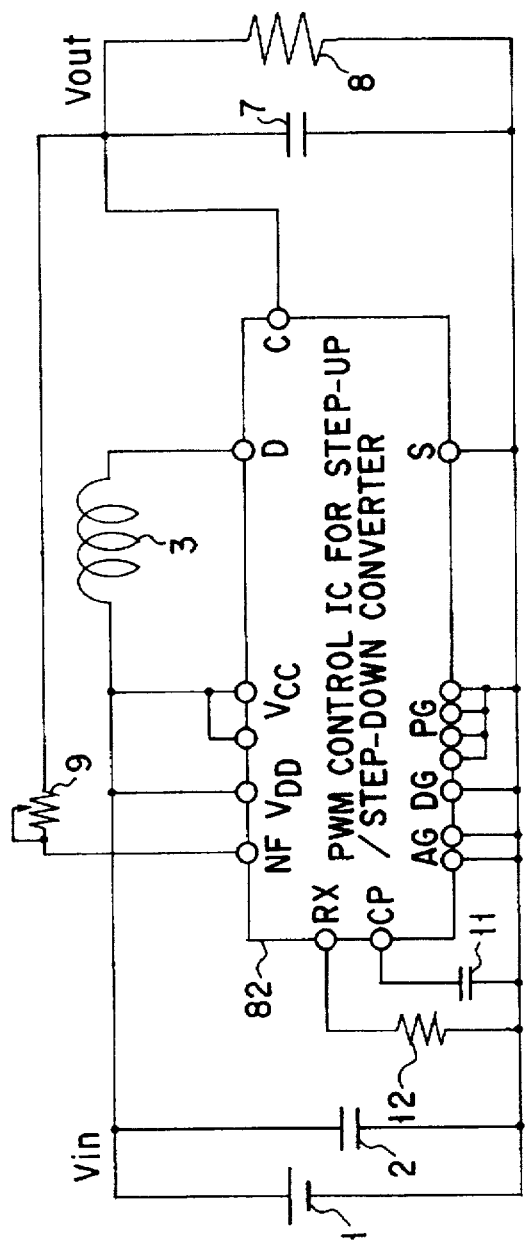
F I G. 23
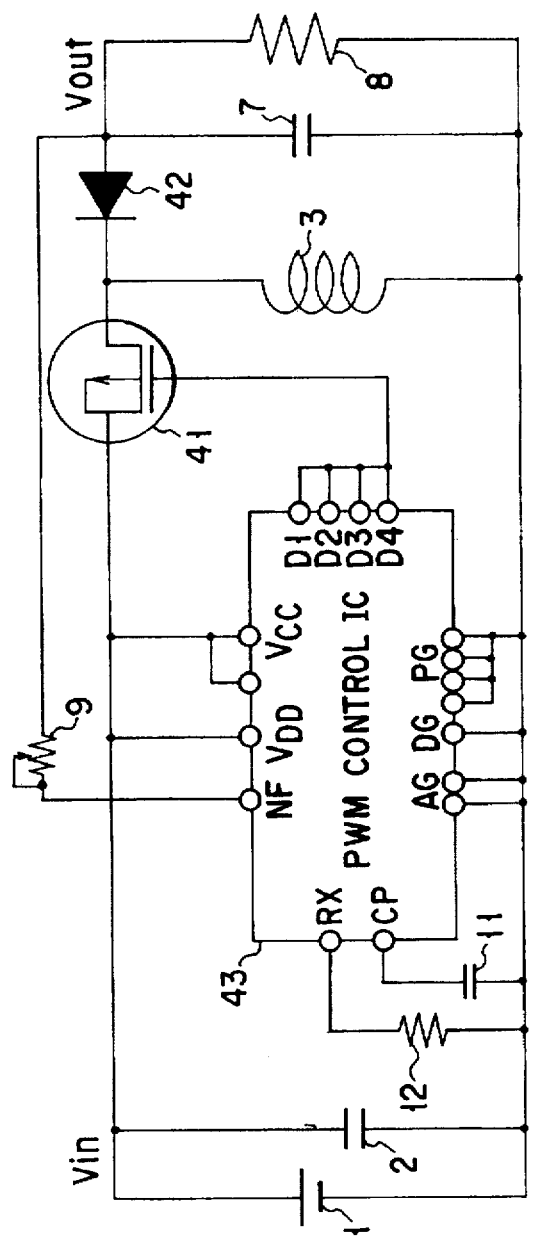
F I G. 24

MICRO POWER SUPPLY DEVICE USING SWITCHING ELEMENT

BACKGROUND OF THE INVENTION

1. Field of the Invention

The present invention relates to a micro power supply device using a switching element for applying a stabilized direct-current power supply voltage to a small-sized electronic apparatus.

2. Description of the Related Art

Various types of electronic apparatus have recently been required to be miniaturized, lightened, increased in operation time, and the like as they improve in performance. To meet these requirements, devices constituting an electronic apparatus increase in degree of integration and decrease in power loss. The above requirements are made for a battery, a switching power source such as a DC/DC converter, and a so-called series regulator. For portable equipment using a battery as a power supply, it is technically important to use energy stored in the battery with high efficiency by applying a stable power supply voltage to the equipment.

To fulfill the above requirements, there is a switching power supply device for switching a direct-current voltage of a DC power supply such as a battery at a high frequency by a chopper circuit and generating a direct-current output voltage by a rectification smoothing circuit. This power supply device, which serves as a micro power supply device using a switching element, is small but effective in functioning as a power supply capable of applying a power supply voltage with high efficiency.

A conventional micro power supply device using a switching element, which is to be loaded into an electronic apparatus, has to satisfy the condition, 0.2 to 0.3 W/cm$^3$ wherein W indicates the capacity of the power supply device and cm$^3$ indicates the volume of the electronic apparatus. In order to satisfy the above condition, an inductor or a capacitor requiring a large space has to be reduced in size, for high-frequency voltage and high-frequency current decrease the size of the inductance or capacitor.

To use the small-sized inductor or capacitor meeting the above condition, the switching element require a switching frequency of about 500 KHz. A vertical MOSFET has been conventionally employed as a switching element capable of achieving a small-sized power supply for applying a stable power supply voltage with high efficiency.

However, for the recent miniaturized electronic equipment, especially a portable telephone, it is necessary to meet the condition of 15 W/cm$^3$. To use a small-sized inductor or capacitor satisfying this condition, a switching element requires a switching frequency of 1 MHz or higher.

If, however, the vertical MOSFET is switched on at the switching frequency of 1 MHz, on-resistance loss is increased; thus, the condition of 15 W/cm$^3$ cannot be satisfied. If a MOSFET is employed as a switching element, the voltage of an input DC power supply is restricted. When the voltage is not higher than $V_{th}+V_{ds}$ ($V_{th}$: threshold voltage, $V_{ds}$: drain-to-source voltage), the MOSFET cannot be turned on in a linearity region, so that current is limited by a high on-resistance and a large amount of heat is generated. To eliminate these problems, the practical use of a switching power supply having a MOSFET is limited only when the voltage of the input DC power supply is considerably higher than $V_{th}+V_{ds}$.

As described above, the conventional micro power supply device using a switching element has the problem that high efficiency cannot be attained at a switching frequency within a frequency band of MHz or the switching element cannot be used when an input voltage is low.

SUMMARY OF THE INVENTION

The first object of the present invention is to provide a micro power supply device using a switching element capable of performing a switching operation with high efficiency even within a frequency band of MHz.

The second object of the present invention is to provide a micro power supply device using a switching element capable of stably performing a switching operation with high efficiency even when an input voltage is low.

To attain the above objects, there is provided a micro power supply device using a switching element, comprising:

a chopper section including an inductance element provided in at least one of a semiconductor switching element for switching an output voltage of a direct-current power supply under condition that a switching frequency is 1 MHz or higher and an on-resistance is 1 ($\Omega$/mm$^2$ (unit area of one side of the switching element)) or lower and a rectifying element for rectifying the output voltage switched by the semiconductor switching element; and a control section for supplying a switching control signal to the control electrode of the semiconductor switching element of the chopper section in response to an output voltage of the rectifying element of the chopper section.

To attain the above objects, there is also provided a micro power supply device using a switching element comprising:

a lateral MOSFET for PWM-switching an output voltage of a direct-current power supply;

an inductor provided between the direct-current power supply and the lateral MOSFET;

a rectifying section for rectifying the output voltage PWM-switched by the lateral MOSFET;

a control section for supplying a PWM control signal to a gate electrode of the lateral MOSFET in response to an output voltage of the rectifying section; and selecting means for selectively supplying the output voltage of the direct-current power supply and the output voltage of the rectifying section to the control section as a power supply voltage of the control section.

The function of the power supply device of the present invention will now be described.

In the power supply device, a semiconductor switching element for switching an output voltage of a direct-current power supply under condition that a switching frequency is 1 MHz or higher and an on-resistance is 1 ($\Omega$/mm$^2$ (unit area of one side of the switching element)) or lower, preferably a lateral MOSFET is adopted. This semiconductor switching element is capable of performing a switching operation with high efficiency at a frequency of 1 MHz. If the frequency is 1 MHz, an inductor and a capacitor satisfying the condition of 15 W/cm$^3$ can be employed; therefore, the power supply device meets the condition.

In the lateral MOSFET of the present invention, when an on-signal is supplied to the gate, the on-resistance is lower than that of the lateral MOSFET through which a direct current flows, and the response of the on-resistance is quick within 30 nanoseconds. Since, furthermore, the parasitic capacitance of the lateral MOSFET is considerably smaller than that of the vertical MOSFET, the switching loss can be fully reduced even within a frequency band of MHz.

Consequently, by using the lateral MOSFET as a switching element of the power supply device, a highly efficient switching operation can be performed within a frequency band of MHz.

Since one of an input voltage supplied from the direct-current power supply and an output voltage supplied to the load, which is not lower than the minimum voltage necessary for operating the MOSFET within a linearity region, or a higher one of the input and output voltages, is applied to the driving means of the control section for turning on/off the MOSFET in response to a pulse width modulated signal, the MOSFET can be operated within the linearity region to allow a switching operation to be stably performed with high efficiency.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a graph showing the time dependence of on-resistance of a lateral MOSFET and that of a vertical MOSFET;

FIG. 2 is a cross-sectional view schematically showing the constitution of a lateral MOSFET;

FIG. 3 is a cross-sectional view schematically showing the constitution of a vertical MOSFET;

FIG. 4 is a graph showing the relationship between frequency and on-resistance loss in the lateral and vertical MOSFETs;

FIG. 5 is a graph showing the relationship between frequency and switching loss in the lateral and vertical MOSFETs;

FIG. 6 is a graph showing the relationship between frequency and total loss in the lateral and vertical MOSFETs;

FIG. 7 is a circuit diagram of a micro power supply device using a switching element according to a first embodiment of the present invention;

FIG. 8 is a circuit diagram specifically showing a PWM control IC used in the micro power supply device shown in FIG. 7;

FIG. 15 is a circuit diagram of a micro power supply device using a switching element according to a fifth embodiment of the present invention;

FIG. 17 is a circuit diagram of a micro power supply device using a switching element according to a seventh embodiment of the present invention;

FIG. 21 is a circuit diagram of a micro power supply device using a switching element according to an eleventh embodiment of the present invention;

FIG. 22 is a circuit diagram of a micro power supply device using a switching element according to a twelfth embodiment of the present invention;

FIG. 23 is a circuit diagram of a micro power supply device using a switching element according to a thirteenth embodiment of the present invention;

FIG. 24 is a circuit diagram of a micro power supply device using a switching element according to a fourteenth embodiment of the present invention;

DETAILED DESCRIPTION OF THE PREFERRED EMBODIMENTS

Figure 9:
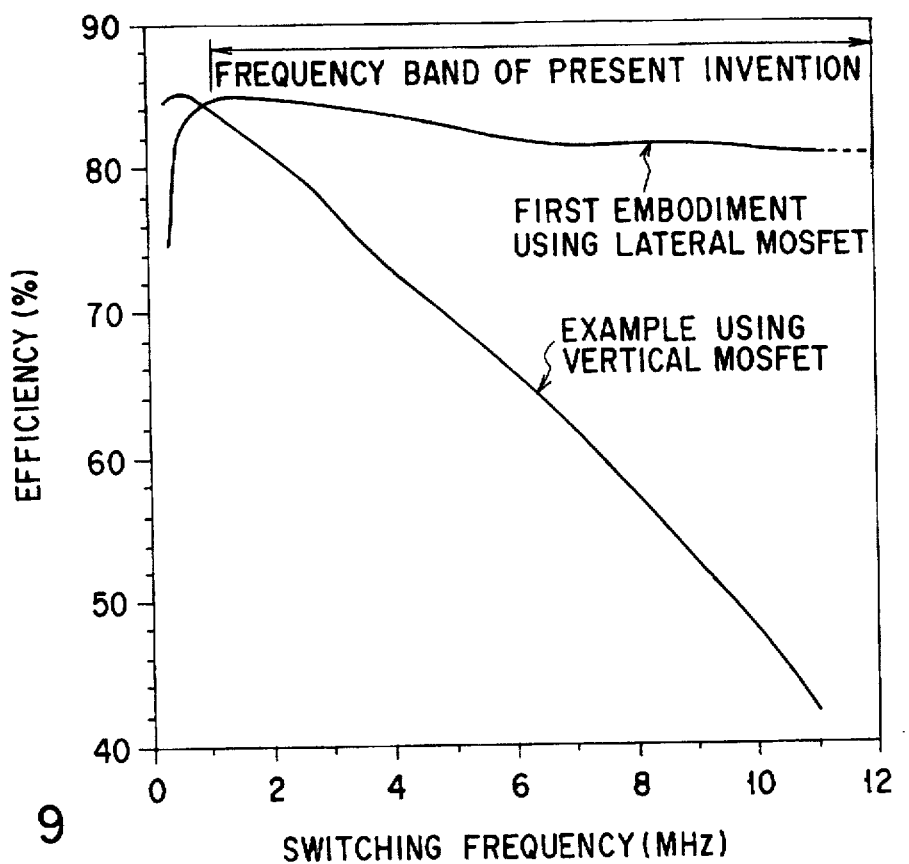
FIG. 9 is a graph of the dependence of voltage conversion efficiency upon switching frequency with respect to the first embodiment and an example to be compared therewith.

Embodiments of the present invention will now be described with reference to the accompanying drawings.

First the differences between a lateral MOSFET and a vertical MOSFET each used as a switching element of a micro power supply device, are described with reference to FIGS. 1 to 6. FIG. 2 illustrates an example of the lateral MOSFET wherein electrodes are formed on the surface side of a substrate to cause current to flow in the element surface direction, while FIG. 3 is an example of the vertical MOSFET wherein one of main electrodes is formed on the under surface side of the substrate to cause current to flow in the element vertical direction. Since the structures of the lateral and vertical MOSFETs are well-known, their detailed descriptions are omitted.

The first advantage of the lateral MOSFET used as a switching element is as follows.

The lateral MOSFET differs from the vertical MOSFET in time dependence of on-resistance for several hundreds of nanoseconds after an on-signal is supplied to a gate. While the on-resistance increases within a range from zero hertz to several megahertz in the vertical MOSFET, it decreases within the same range in the lateral MOSFET.

FIG. 1 is a graph showing variations in on-resistance with respect to time t elapsed from when the on-signal is supplied to the gate, specifically from time (t=0) when a gate-to-source voltage $V_{gs}$ rises from 0V to 4V) in the lateral and vertical MOSFETs.

As shown in FIG. 1, the on-resistance of each of the lateral and vertical MOSFETs becomes lower than that ($V_{gs}=4V_{dc}$) of the MOSFETs through which a direct current flows. The on-resistance of the vertical MOSFET continues to be higher than that (0.2 $\Omega$) of the vertical MOSFET through which a direct current flows, until the elapsed time t reaches 80 nsec and its average is approximately 1 $\Omega$. In contrast, the on-resistance of the lateral MOSFET is approximately 0.1 $\Omega$ which is lower than that (0.5 $\Omega$) of the lateral MOSFET through which a direct current flows, before the elapsed time t reaches 10 nsec. In both the vertical and lateral MOSFETs, the on-resistance remains 0.1 $\Omega$ after t=100 nsec. This difference between the lateral and vertical MOSFETs depends upon a difference in response speed at which the on-signal is applied to the gate.

If, therefore, the lateral MOSFET is adopted in place of the conventional vertical MOSFET, the switching loss can be reduced to approximately one-tenth within a frequency band of MHz. Practically it is only necessary that the on-resistance of the lateral MOSFET be lower than that of the MOSFET through which a direct current flows, when elapsed time t is 30 nsec, favorably 10 nsec. Such a lateral MOSFET is designed to meet the switching conditions that the switching frequency is 1 or higher (MHz) and the on-resistance is 1 or lower ($\Omega$/area of gate electrode).

The second advantage of the lateral MOSFET is as follows.

The input capacitance $C_{iss}$, output capacitance $C_{oss}$, and feedback capacitance $C_{rss}$ of the lateral MOSFET which cause a switching loss, are approximately 1/10 as small as those of the vertical MOSFET.

The switching loss due to the input capacitance $C_{iss}$ will be first described. In the switching operation of the MOSFET, when gate-to-source voltage $V_{gs}$ is switched to a voltage which is higher or lower than threshold voltage $V_{th}$, charge or discharge has to be performed through the gate. Then the energy accumulated in the input capacitance is all emitted and forms part of the switching loss.

In the on-state of the MOSFET, if the gate-to-source voltage $V_{gs}$ is set to $V_{gson}$ and the switching frequency is f, the switching loss is almost proportional to $f \cdot C_{iss} \cdot V_{gson}^2$.

While the input capacitance $C_{iss}$ of the vertical MOSFET ranges from 100 to 1000 pF, that of the lateral MOSFET is smaller and ranges from 10 to 100 pF. Thus, the switching loss due to the input capacity $C_{iss}$ can be reduced to one-tenth in the lateral MOSFET.

Since the switching loss due to the output capacitance $C_{oss}$ and feedback capacity $C_{rss}$ corresponds to energy required for discharging when an on-signal is input, it is $\frac{1}{2} \cdot f \cdot (C_{rss}+C_{oss}) \cdot V_{gson}^2$. The gate-to-source voltage $V_{gs}$ is set to $V_{gso}$ when it is switched. Since $C_{rss}+C_{oss}$ is almost proportional to $C_{iss}$, the switching loss due to the output capacitance and feedback capacitance can also be reduced to one-tenth.

It is thus evident from the above that the lateral MOSFET can sufficiently reduce in switching loss even in a frequency band of MHz since the response of on-resistance is quick when the on-signal is supplied and the parasitic capacitance is small.

The above first and second advantages of the lateral MOSFET will now be described again, with reference to FIGS. 4 to 6.

In the relationship between the frequency and on-resistance loss as shown in FIG. 4, the on-resistance loss of the vertical MOSFET is less than that of the lateral MOSFET when the frequency is 1 MHz or lower. If, however, the frequency exceeds 1 MHz, the on-resistance loss of the lateral MOSFET becomes smaller than that of the vertical MOSFET. When the frequency is approximately 1 MHz, the on-resistance loss is 225 mW level.

In the relationship between the frequency and switching loss as shown in FIG. 5, as the frequency increases, a difference in switching loss between the vertical and lateral MOSFETs is widened. Needless to say, the switching loss of the lateral MOSFET is less than that of the vertical MOSFET.

In the relationship between the frequency and total loss of FET as shown in FIG. 6, the total loss of the vertical MOSFET is less than that of the lateral MOSFET when the frequency is the vicinity of 500 KHz or lower. If, however, it exceeds the vicinity of 500 KHz, the total loss of the lateral MOSFET becomes smaller than that of the vertical MOSFET. When the frequency is the vicinity of 500 KHz, the total loss is 250 mW level.

A micro power supply device using a switching element according to each of the embodiments of the present invention will now be described in detail.

EMBODIMENT 1

FIG. 7 shows a micro power supply device using a switching element according to a first embodiment of the present invention. This micro power supply device is a switching power supply device comprising a chopper and a controller. The chopper includes a DC power supply, a switching element, an inductor, a transformer, a rectifier circuit, a smoother circuit, etc., and the controller includes a feedback circuit, a PWM controller circuit, etc.

The switching power supply device shown in FIG. 7 is a step-up DC/DC converter which receives a voltage from an input DC power supply 1 and boosts and stabilizes the voltage to output a DC voltage. The input DC power supply is, for example, a battery.

As shown in FIG. 7, a stabilizing capacitor 2 is connected in parallel to the input DC power supply 1 to stabilize an input voltage $V_{in}$ supplied from the power supply 1, and a lateral N-channel MOSFET (hereinafter referred to as FET) 4 serving as a switching element is connected to the input DC power supply 1 through an inductance 3. The FET 4 is turned (switched) on/off in response to a control signal from a pulse width modulation control IC (hereinafter referred to as PWM control IC) 5.

The voltages generated at both ends of the FET 4 by switching of the FET 4, are rectified and smoothed by a rectifying diode 6 and a smoothing capacitor 7, respectively, in other words, they are converted into a DC voltage. The DC voltage is then supplied as an output voltage $V_{out}$ to a load 8 including, e.g., a portable telephone or another electronic apparatus. The output voltage $V_{out}$ is fed back to the PWM control IC 5 via a variable resistor 9.

The PWM control IC 5 is integrated for the purpose of miniaturizing the micro power supply device and increasing its operation. Capacitors 10 and 11 and resistor 12 are connected to the IC 5 as external elements.

An operation of the foregoing micro power supply device using a switching element will be described briefly, though it has been already well-known.

The FET 4 is switched or turned on/off in response to a pulse width modulation signal supplied to a gate thereof from the PWM control IC 5. While the FET 4 is in an on-state, a current flows from the input DC power supply 1 to the inductor 3, and energy is accumulated therein. When the FET 4 is turned off, the energy is emitted from the inductor 3 to the load 8 through the diode 6. The DC voltage is always applied to the load 8 by the smoothing operation of the capacitor 7.

The output voltage applied to the load 8 is fed back to the PWM control IC 5 via the variable resistor 9, and the IC 5 varies the waveform (duty ratio) of a pulse width modulated signal in order to fix the feedback output voltage $V_{out}$ or minimize a difference between the output voltage $V_{out}$ and reference voltage. If the output voltage $V_{out}$ is higher than the reference voltage, the duty ratio of the PMW modulated signal and the energy accumulated in the inductor 3 is reduced. On the other hand, when the output voltage $V_{out}$ is lower than the reference voltage, the duty ratio is increased and so is the energy. Thus, the load 8 is supplied with the stabilized and boosted output voltage $V_{out}$ based on the input voltage $V_{in}$ from the input DC power supply 1.

In order to make the aforementioned two advantages of the lateral MOSFET more effective, it is desirable that the FET 4 is driven at a gate potential of several tens of nanoseconds. If the FET 4 is turned on/off by control of pulse width or in response to the pulse width modulated signal in view of variations in the load 8, it is necessary that the duty ratio of the pulse width modulated signal be set to zero when the no load is applied and maximized when the maximum load is applied.

FIG. 8 is a circuit diagram specifically showing the PWM control IC 5 of the micro power supply device of FIG. 7. The PWM control IC 5 includes a pulse width modulated signal generation circuit section 20 and a drive circuit section 30 for amplifying a pulse width modulated signal and turning on/off the FET 4.

In the pulse width modulated signal generation circuit section 20, the output voltage $V_{out}$ fed back to a feedback input terminal NF is supplied to an error amplifier 21 to amplify an error voltage corresponding to a difference between the output voltage $V_{out}$ and a reference voltage set in the error amplifier 21. The amplified error voltage, whose amplitude is limited by a limiter 22, is supplied to one of input terminals of a comparator 23. The other input terminal thereof is supplied with a triangular wave signal generated from an oscillator 24. A capacitor 25 is one of elements for determining the oscillating frequency of the oscillator 24. The comparator 23 produces a signal whose level becomes high during which period the triangular wave signal exceeds the level of output signal of the limiter 22 and whose level becomes low during the other period, in other words, the comparator 23 outputs a pulse width modulated signal whose duty ratio varies with the error voltage. The pulse width modulated signal is shaped into a correct rectangular wave by a waveform shaping device 26 and output from the pulse width modulated signal generation circuit section 20.

The drive circuit section 30 includes a plurality of (four in this embodiment) amplifiers 31 to 34 which are arranged in parallel. The pulse width modulated signal is input from the section 20 is amplified by these amplifiers, and the amplified signals are output from respective four drive output terminals D1 to D4. As illustrated in FIG. 7, these drive output terminals D1 to D4 are connected in common outside the section 30, and the common connecting terminal is connected to the gate of the FET 4.

In FIG. 8, Vcc is a power supply terminal which is connected to a positive terminal of the input DC power supply 1 shown in FIG. 7, and AG and PG are ground terminals which are connected to a negative terminal thereof. A comparator 27 is designed to compare an output voltage $V_{out}$ fed back to the feedback input terminal NF and a power supply input voltage applied to the power supply terminal Vcc (i.e., input voltage $V_{in}$ supplied from the input DC power supply 1) to supply a high-level signal to a comparison output terminal CMP when $V_{in}<V_{out}$ and a low-level signal when $V_{in}>V_{out}$. This comparator 27 is employed in another embodiment described later. The comparison output terminal CMP is not shown in FIG. 7 since it is not used in the first embodiment.

Since the FET 4 has to be turned on/off within a frequency band of MHz, a quick response is particularly required for the drive circuit section 30 of the PWM control IC 5. It is thus desirable to achieve the PWM control IC 5 using a Bi-CMOS of quick response. For this reason, the micro power supply device shown in FIG. 7 is constituted by a Bi-CMOSIC or a Bi-CMOSLSI. Another advantage of the lateral MOSFET is that it is simpler to mount the lateral MOSFET on one chip together with the PWM control IC 5 than the vertical MOSFET. This simple mounting is advantageous to a decrease in size and cost of the device.

FIG. 9 shows variations in efficiency (output voltage/input voltage×100%) of the power supply device of FIG. 7, comparing the first embodiment using the FET 4 as a lateral MOSFET and an example using a vertical MOSFET. In this example, the switching frequency of the FET 4 is varied from 1 MHz to 11 MHz while the input voltage $V_{in}$ applied from the input DC power supply is 3.6 V and the output voltage $V_{out}$ applied to the load 8 is 5 V.

As is apparent from FIG. 9, in the example, the efficiency starts to decrease when the frequency exceeds 1 MHz and greatly lowers below 80% when the frequency is several megahertz (MHz). In the first embodiment, the efficiency of 80% or more is attained when the frequency ranges from 1 MHz to 11 MHz. Comparing both of them, the efficiency of the first embodiment is 13% higher than that of the example at the frequency of 5 MHz and it is 34% higher at the frequency of 10 MHz.

The following are second to sixteenth embodiments of the present invention. In these embodiments, the same elements as those of the first embodiment shown in FIG. 7 are denoted by the same reference numerals and their descriptions are omitted or simplified.

EMBODIMENT 2

Figure 10:
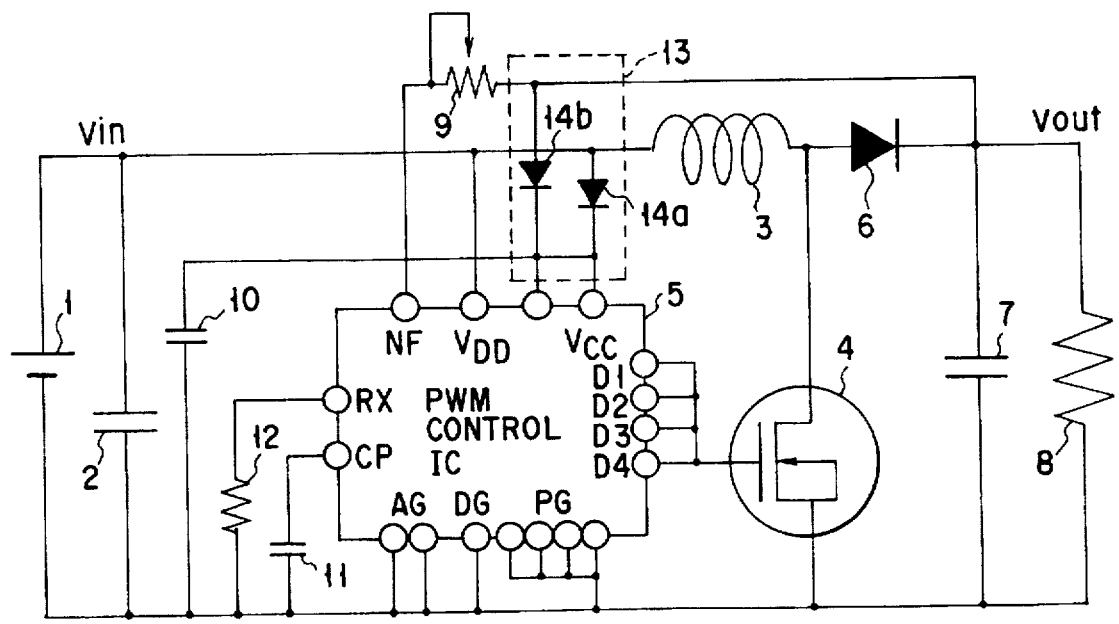
FIG. 10 is a circuit diagram of a micro power supply device using a switching element according to a second embodiment of the present invention.

FIG. 10 is a circuit diagram of a micro power supply device using a switching element according to a second embodiment of the present invention. This micro power supply device is a step-up DC/DC converter applicable to a low input voltage. The second embodiment differs from the first embodiment in that a power supply voltage selection circuit 13 is added.

The power supply voltage selection circuit 13 is a circuit for selecting a higher one of an input voltage $V_{in}$ applied from the input DC power supply 1 and an output voltage $V_{out}$ applied to the load 8, as a power supply voltage applied to the power supply terminal VCC of the drive circuit section 30 shown in FIG. 8. The circuit 13 includes a diode 14a whose anode is connected to the positive terminal of the input DC power supply 1 and a diode 14b whose anode is connected to one end of the load 8. The cathodes of the diodes 14a and 14b are connected to the power supply terminal VCC.

According to the second embodiment, even when the input voltage $V_{in}$ applied from the input DC power supply 1 does not reach $V_{th}+V_{ds}$ ($V_{th}$: threshold voltage, $V_{ds}$: drain-to-source voltage), the device can stably be operated with high efficiency.

Figures 11A, 11B:
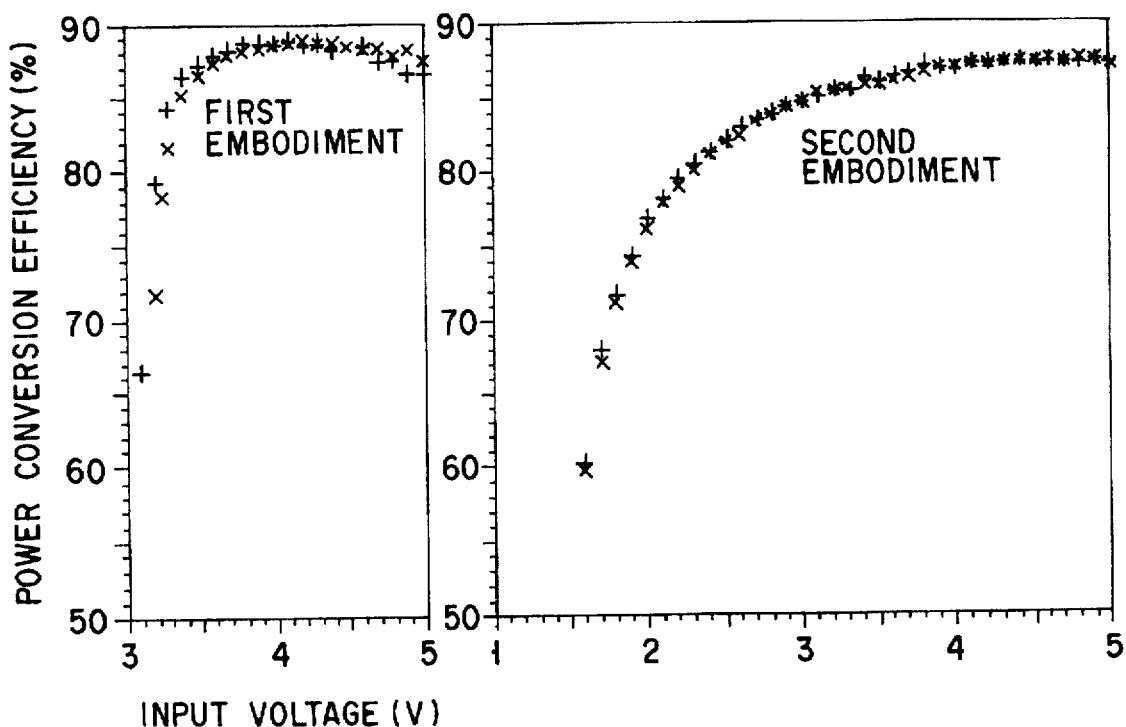
FIGS. 11A and 11B are diagrams showing the dependencies of power conversion efficiency upon input voltage with respect to the first and second embodiments, respectively.

FIGS. 11A and 11B show the dependence of power conversion efficiency upon input voltage in each of the first and second embodiments. In this case, the output power is set to 1 W (output voltage $V_{out}$=5 V, resistance of load 8=20 Ω).

As seen from FIGS. 11A and 11B, the device of the second embodiment can operate and output a voltage of 5 V even when the input voltage $V_{in}$ is lower than 3.1 V, whereas that of the first embodiment cannot operate. In the second embodiment, the efficiency of 80% can be attained even when the input voltage $V_{in}$ is 2.3 V. In the first embodiment, when the input voltage is lower than 3.1 V, the on-resistance of the FET 4 in a linearity region is not set to a low state but a high state which is close to that in a saturated region, and a voltage of 5 V cannot be output due to the on-resistance loss. In the second embodiment, since the power supply voltage selection circuit 13 is operated to select a higher one of input and output voltages $V_{in}$ and $V_{out}$ and apply it to the drive circuit section 30 as an input power supply voltage, if a step-up operation is started, the output voltage $V_{out}$ is applied even though the input voltage $V_{in}$ does not reach $V_{th}+V_{ds}$. Therefore, a voltage of 5 V can be output from the power supply device of the second embodiment.

Figure 12:
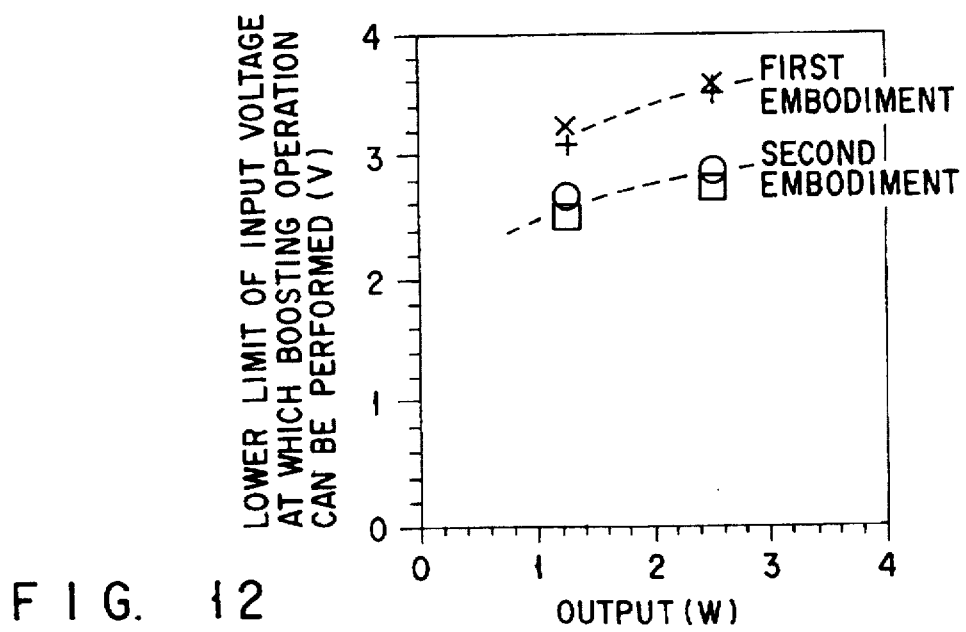
FIG. 12 is a diagram showing the dependence of the lower limit of an input voltage at which a step-up operation can be performed, upon an output voltage with respect to each of the first and second embodiments.

FIG. 12 shows the dependence of the lower limit of input voltage $V_{in}$ upon output voltage with respect to each of the first and second embodiments, respectively.

In both the first and second embodiments, when the input voltage $V_{in}$ is raised from 0 V, a pulse width control signal is generated when the input voltage. $V_{in}$ is 1.8 V. However, no step-up operation is performed before the input voltage $V_{in}$ reaches $V_{th}+V_{ds}$. The input voltage applied when the step-up operation ($V_{in}<V_{out}$), is equal to 3.1 V in the first embodiment which decreases the on-resistance of the FET 4 in the linearity region. In the second embodiment, since a voltage of 5 V continues to be applied to the drive circuit section 30 until the input voltage arrives at 3 V, the step-up operation can be started at a voltage which is 0.6 V lower than that in the first embodiment. As shown in FIG. 12, the lower limit of the input voltage at which the step-up operation can be performed, rises as the output voltage increases. It is however seen that the step-up ;operation of the second embodiment is started at a voltage which is 0.6 V lower than that in the first embodiment, irrespective of the lower limit of the input voltage.

In the foregoing second embodiment, the power supply voltage selection circuit selects a higher one of the input and output voltages $V_{in}$ and $V_{out}$ as a power supply voltage applied to the drive circuit section 30. If, however, the input and output voltages each have at least the minimum value necessary for operating the FET 4 in the linearity region, both of them can be used as a power supply voltage applied to the drive circuit section 30.

EMBODIMENT 3

Figure 13:
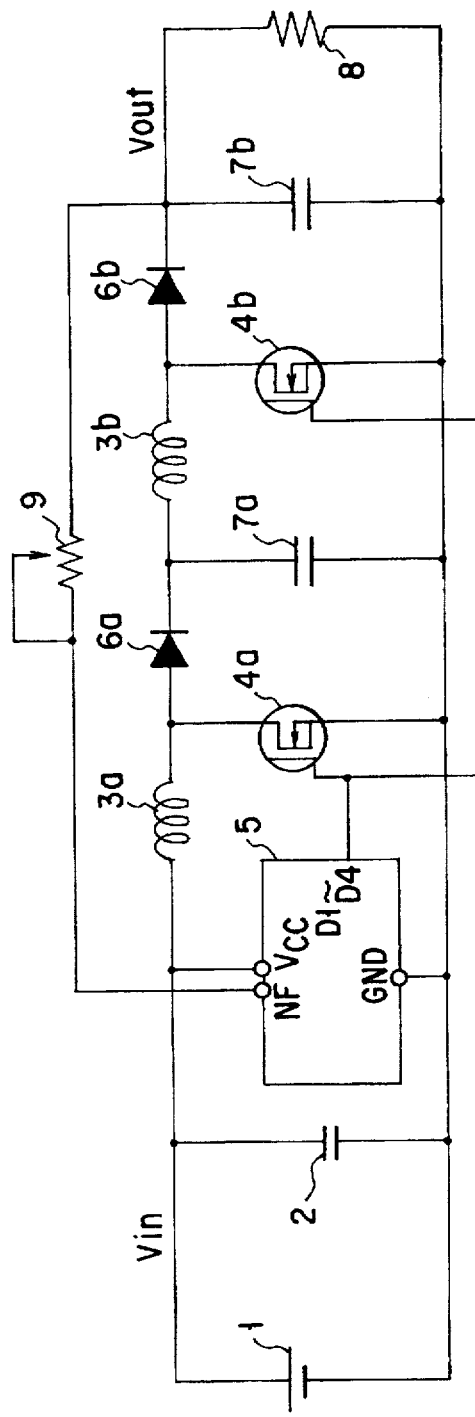
FIG. 13 is a circuit diagram of a micro power supply device using a switching element according to a third embodiment of the present invention.

FIG. 13 is a circuit diagram showing a micro power supply device using a switching element according to a third embodiment of the present invention. This micro power supply device is a step-up DC/DC converter having two cascade-connected chopper circuits for increasing in step-up ratio. The first chopper circuit includes an inductor 3a, an FET 4a, a diode 5a and a capacitor 6a, while the second chopper circuit does an inductor 3b, an FET 4b, a diode 5b and a capacitor 6b. In the third embodiment, the output voltage $V_{out}$ can be controlled by a variable resistor 9.

According to the third embodiment, if the input voltage $V_{in}$ applied from the input DC power supply 1 is 5 V, the output voltage $V_{out}$ is 40 V, an output power is 1 W, and the switching frequency of the FET 4a and 4b is 5 MHz, the efficiency of 55% is attained.

Embodiment 4

Figure 14:
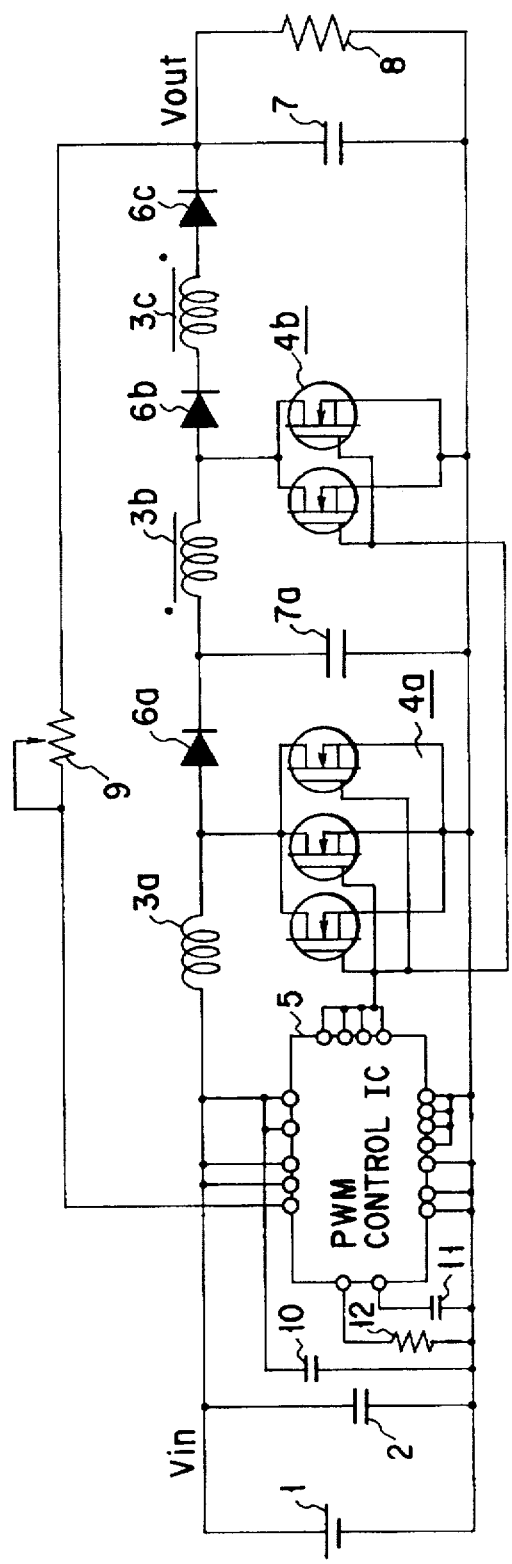
FIG. 14 is a circuit diagram of a micro power supply device using a switching element according to a fourth embodiment of the present invention.

FIG. 14 is a circuit diagram showing a micro power supply device using a switching element according to a fourth embodiment of the present invention. The device is so formed that a resonance operation is partially carried out. Inductors 3b and 3c constitute an output transformer. The objective of the transformer will be attained unless its coupling coefficient is −1, and the inductors 3a and 3b can be independent of each other. Each of FET sections 4a and 4b includes a plurality of lateral MOSFETs (two or three lateral MOSFETs in FIG. 14).

According to the fourth embodiment, the efficiency of 60% can be obtained under the same conditions as those of the third embodiment. According to the third embodiment, when an on-signal is generated, the FET sections 4a and 4b filled with the same charges as those of the capacitors $C_{rss}$ and $C_{oss}$ are discharged. If, however, the resonance operation is performed as in the fourth embodiment, the discharge can be avoided thereby to improve in efficiency.

EMBODIMENT 5

FIG. 15 is a circuit diagram showing a micro power supply device using a switching element according to a fifth embodiment of the present invention. In this device, a charge pump circuit 15 having a double step-up ratio is used as a rectification smoothing circuit. The charge pump circuit 15 includes a plurality of diodes 15A and a plurality of capacitors 15B. In this embodiment, the input voltage $V_{in}$ applied from the input DC power supply 1 is 5 V, while the output voltage is 20 V and 40 V.

EMBODIMENT 6

Figure 16:
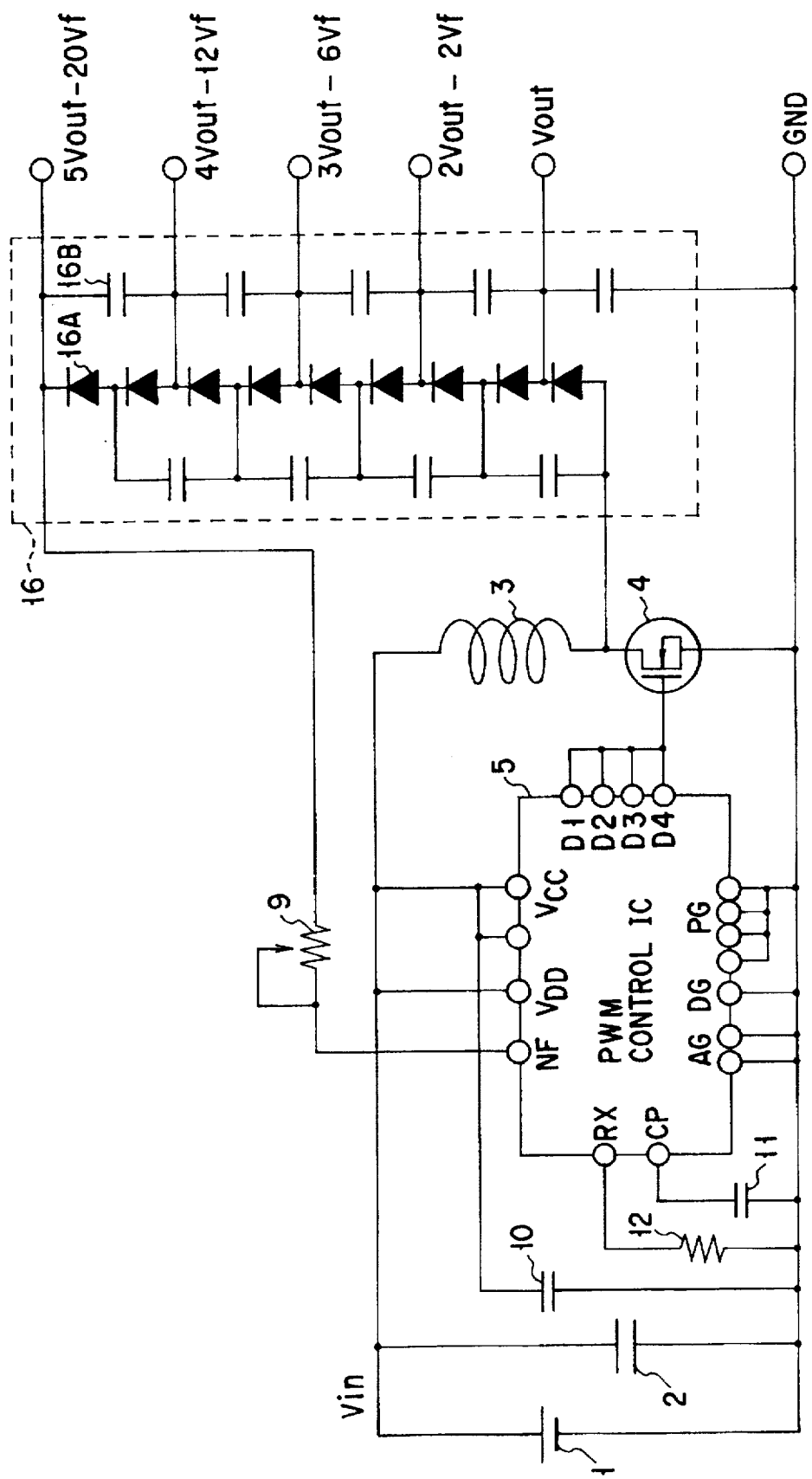
FIG. 16 is a circuit diagram of a micro power supply device using a switching element according to a sixth embodiment of the present invention.

FIG. 16 is a circuit diagram showing a micro power supply device using a switching element according to a sixth embodiment of the present invention. In this device, too, a charge pump circuit 16 is used, but its step-up ratio is set such that the circuit 16 outputs a double to quintuple voltage. The charge pump circuit 16 includes a plurality of diodes 16A and a plurality of capacitors 16B. According to the sixth embodiment, the input voltage $V_{in}$ applied from the input DC power supply 1 is 5 V, while the output voltage $V_{out}$ may exceed 100 V.

EMBODIMENT 7

FIG. 17 is a circuit diagram showing a micro power supply device using a switching element according to a seventh embodiment of the present invention, and the device is a step-down DC/DC converter. As illustrated in FIG. 17, a lateral PMOSFET 41 and an inductor 3 are connected in series between the input DC power supply 1 and load 8, and the connection of a rectifying diode 42 is changed accordingly.

Since, in the step-down DC/DC converter, a PMOSFET is employed in the FET 41, the polarity of a pulse width modulated signal is inverted. In other words, a PWM control IC 43 shown in FIG. 17 has inversion output terminals /D1 to /D4 corresponding to the drive output terminals D1 to D4.

As in the first to sixth embodiment described above, the output voltage $V_{out}$ can be controlled by a variable resistor 9. According to the seventh embodiment, the input voltage $V_{in}$ applied from the input DC power supply 1 is 5 to 20 V, while the output voltage $V_{out}$ is 6.5 V and the output is 1 W. When the switching frequency is 5 MHz, efficiency of 85% can be obtained.

EMBODIMENT 8

Figure 18:
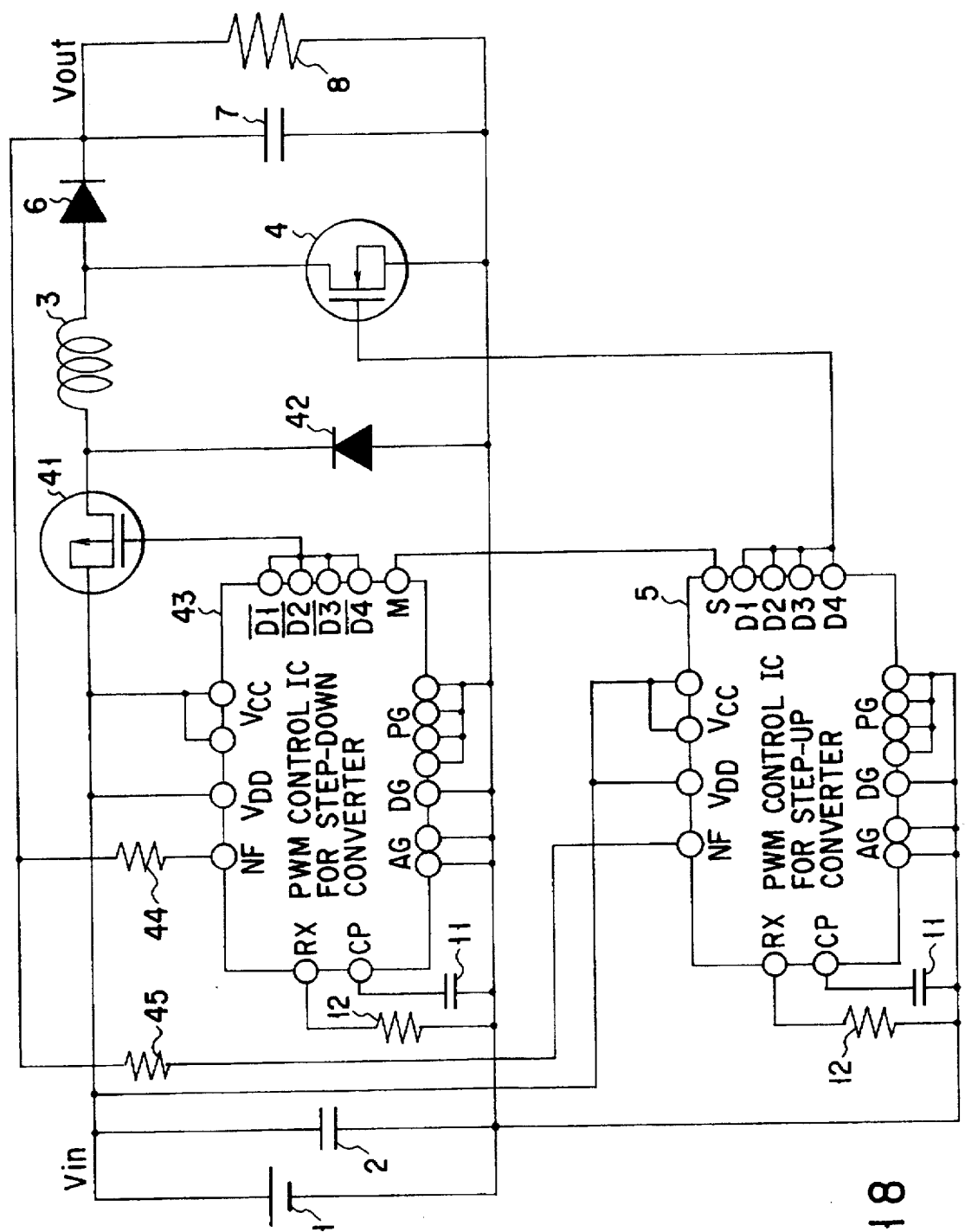
FIG. 18 is a circuit diagram of a micro power supply device using a switching element according to an eighth embodiment of the present invention.

FIG. 18 is a circuit diagram showing a micro power supply device using a switching element according to an eighth embodiment of the present invention. The device is a step-up/step-down DC/DC converter capable of both step-up and step-down operations, and constituted by combining the step-up DC/DC converter of FIG. 1 and the step-down DC/DC converter of FIG. 7, as illustrated in FIG. 18. PWM control ICs 5 and 43 are provided for the respective converters.

The PWM control IC5 used for the step-up converter for turning on/off an NMOSFET 4 and the PWM control IC 43 used for the step-down converter for turning on/off a PMOSFET 41 are provided with master and slave sync terminals M and S, respectively. By connecting these terminals, both the PWM control ICs 5 and 43 are synchronized with each other. When the input voltage $V_{in}$ applied from the input DC power supply 1 is lower than the output voltage $V_{out}$, the NMOSFET 4 is subjected to ON—ON control and the PMOSFET 41 is always rendered in an OFF-state to serve as a step-up DC/DC converter. When the input voltage $V_{in}$ is higher than the output voltage $V_{out}$, the PMOSFET 41 is subjected to ON—ON control and the NMOSFET 4 is always rendered in an OFF-state to serve as a step-down DC/DC converter. When the input and output voltages are almost equal to each other, both the FETs 4 and 41 have only to be subjected to ON–OFF control. In FIG. 18, reference numerals 44 and 45 indicate resistors connected to the NF terminals of ICs 5 and 43, respectively.

EMBODIMENT 9

Figure 19:
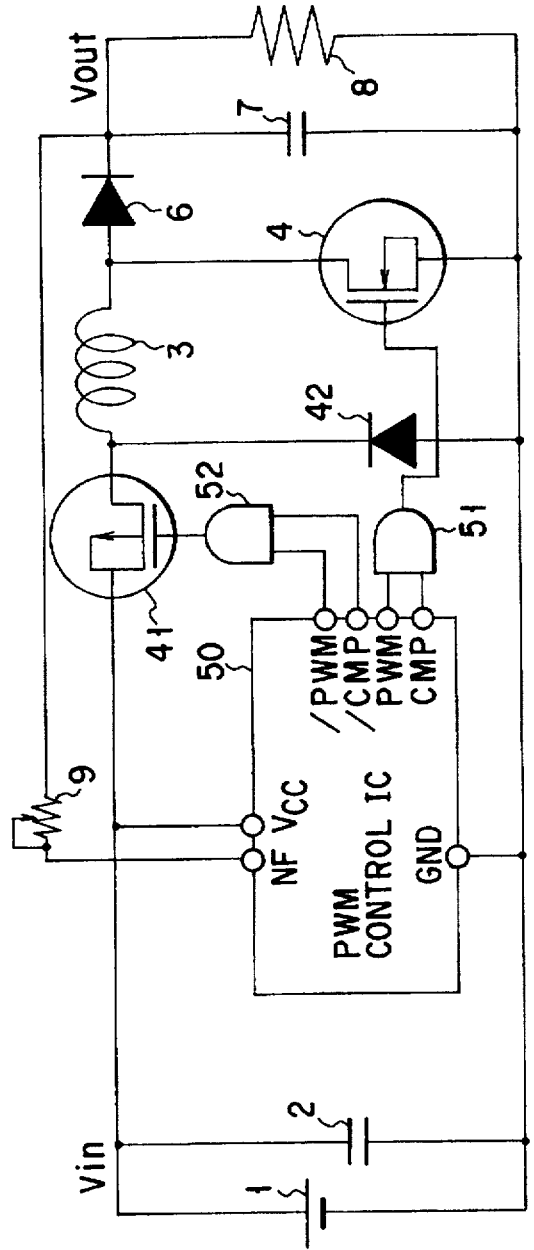
FIG. 19 is a circuit diagram of a micro power supply device using a switching element according to a ninth embodiment of the present invention.

FIG. 19 is a circuit diagram showing a micro power supply device using a switching element according to a ninth embodiment of the present invention. This device includes a PWM control IC 50 having both functions of the step-up converter PWM control IC5 and step-down converter PWM control IC 43 shown in FIG. 18. A terminal PWM of the PWM control IC 50 corresponds to a set of the drive output terminals D1 to D4 described above, a terminal CMP thereof is an output terminal for outputting a signal compared by the comparator 27 shown in FIG. 8, and a terminal/CMP is an output terminal for outputting an inverted signal thereof. The output signals of the terminals PWM and CPM are supplied to a gate circuit 51, and the output signal of the gate circuit 51 is input to the gate of the NMOSFET 4. Moreover, the output signals of the terminals PWM and /CMP are supplied to a gate circuit 52, and the output signal of the gate circuit 52 is input to the gate of the PMOSFET 41.

While the terminal /CMP is provided to always turn on the step-down PMOSFET 41 in the step-up operation, the terminal CMP is done to always turn off the step-up NMOSFET 4 in the step-down operation. In other words, when the levels of terminals /CMP and CMP are low and high, respectively, the PMOSFET 41 is always turned on and the NMOSFET 4 is turned on and turned off in accordance with the high and low levels of terminal PWM, respectively, thus performing a step-up operation. When the levels of terminals CMP and /CMP are low and high, respectively, the NMOSFET 4 is always turned off and the PMOSFET 41 is turned on and turned off in accordance with the low and high levels of terminal PWM, respectively, thus performing a step-down operation.

EMBODIMENT 10

Figure 20:
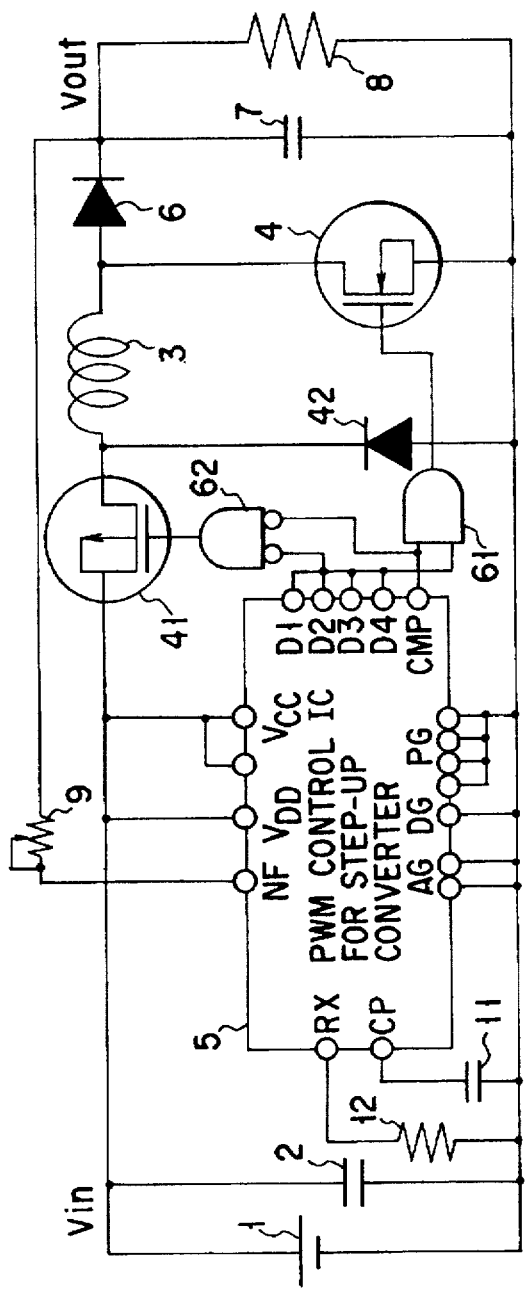
FIG. 20 is a circuit diagram of a micro power supply device using a switching element according to a tenth embodiment of the present invention.

FIG. 20 is a circuit diagram showing a micro power supply device using a switching element according to a tenth embodiment of the present invention. In this device, the same function as that of the device shown in FIG. 19 is fulfilled by combining a PWM control IC 4 for a step-up converter with gate circuits 61 and 62.

(EMBODIMENT 11

FIG. 21 is a circuit diagram showing a micro power supply device using a switching element according to an eleventh embodiment of the present invention. In this device, the same function as that of the device shown in FIG. 19 is performed by combining a PWM control IC 43 for a step-down converter with gate circuits 71 and 72.

EMBODIMENT 12

FIG. 22 is a circuit diagram showing a micro power supply device using a switching element according to a twelfth embodiment of the present invention. In this device, the same function as that of the device shown in FIG. 19 is fulfilled by using a PWM control IC 81 for a step-up/step-down converter in which drive output terminals D3 and D4 are replaced with inversion output terminals /D3 and /D4, in other words, by incorporating the functions of the gate circuits 51 and 52 shown in FIG. 19 into the PWM control IC 81.

EMBODIMENT 13

FIG. 23 is a circuit diagram showing a micro power supply device using a switching element according to a thirteenth embodiment of the present invention. This device comprises a PWM control IC 82 for a step-up/step-down converter into which the FETs 4 and 41 and diodes 6 and 42 shown in FIG. 22 are incorporated. According to the thirteenth embodiment, since the external elements are only L, C and R and thus the number of elements is greatly reduced, the device can be decreased in size, weight and cost.

EMBODIMENT 14

FIG. 24 is a circuit diagram showing a micro power supply device using a switching element according to a fourteenth embodiment of the present invention. In this device, an inversion DC/DC converter is constituted by changing the positions of inductor 3 and diode 42 shown in FIG. 17 to each other. In this embodiment, a feedback input terminal NF senses the current to be drawn out since its polarity is negative.

EMBODIMENT 15

Figure 25:
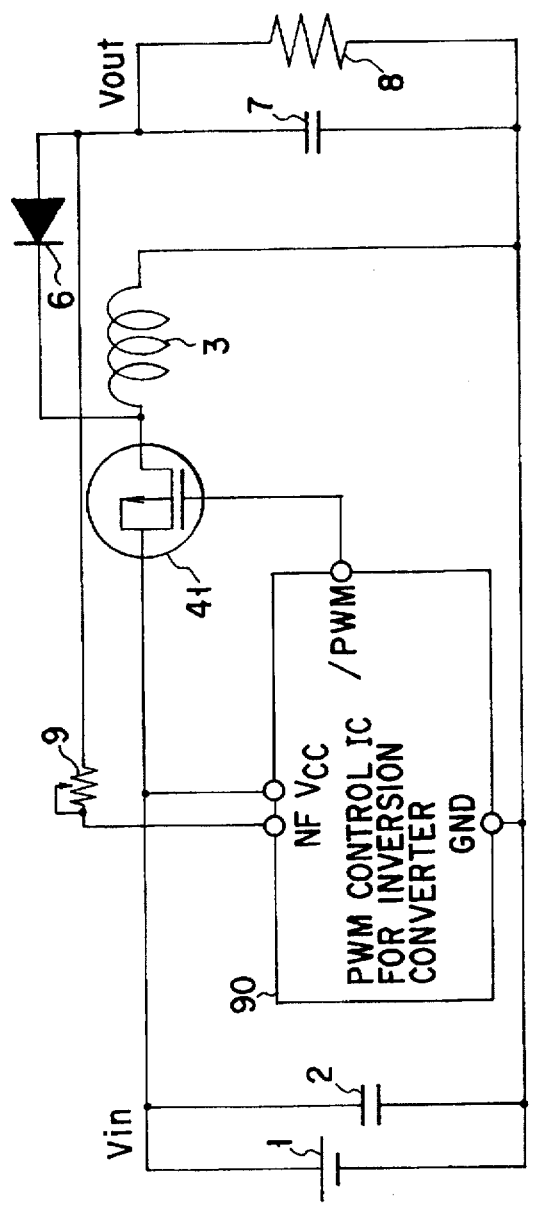
FIG. 25 is a circuit diagram of a micro power supply device using a switching element according to a fifteenth embodiment of the present invention.

FIG. 25 is a circuit diagram showing a micro power supply device using a switching element according to a fifteenth embodiment of the present invention. In this device, an inversion DC/DC converter is constituted by combining a PWM control IC 90 for an inversion converter and gate circuits 91 and 92.

EMBODIMENT 16

Figure 26:
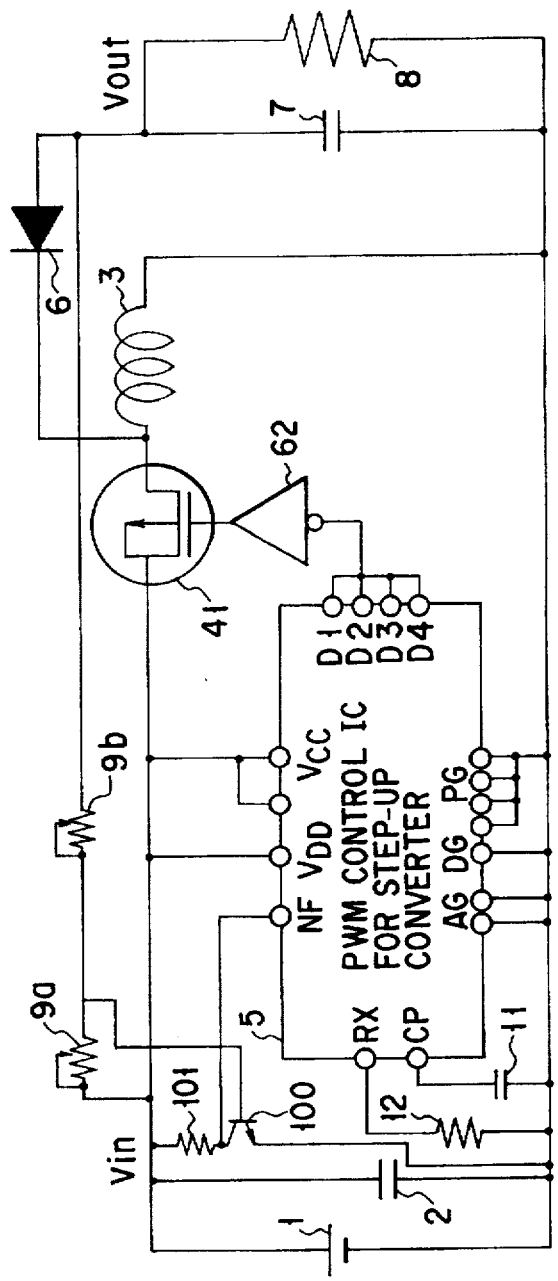
FIG. 26 is a circuit diagram of a micro power supply device using a switching element according to a sixteenth embodiment of the present invention.

FIG. 26 is a circuit diagram showing a micro power supply device using a switching element according to a sixteenth embodiment of the present invention. In this device, a PWM control IC 5 for a step-up converter is used as in the tenth embodiment shown in FIG. 20, and an inversion DC/DC converter is constituted by combining the IC 5 with a gate circuit 62. In FIG. 26, reference numerals 100 and 101 indicate a transistor and a resistor, respectively, which are incorporated into a feedback circuit.

As described above, according to the present invention, there can be provided a micro power supply device using a switching element which can be operated with high efficiency by considerably reducing a switching loss even within a switching frequency band of MHz.

Furthermore, there can be provided a micro power supply device using a switching element which can stably be operated with high efficiency by operating a MOSFET within a linearity region even if an input voltage applied from an input DC power supply is dropped.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A micro power supply device using a switching element, comprising:

a chopper section including a lateral MOSFET for switching an output voltage of a direct-current power supply at a switching frequency of 1 MHz or higher and an on-resistance of 1 $\Omega/mm^2$ (ohm per unit area of one side of the lateral MOSFET) or lower, a rectifying element for rectifying the output voltage switched by the lateral MOSFET, and an inductance element provided in at least one of the lateral MOSFET and the rectifying element; and a control section for supplying a switching control signal to a control electrode of said lateral MOSFET of said chopper section in response to an output voltage of said rectifying element of said chopper section.

2. The micro power supply device according to claim 1, wherein said control section includes:

signal generating means for generating the switching control signal;

driving means for amplifying the switching control signal generated from said signal generating means and driving the lateral MOSFET; and selecting means for selecting one of the output voltage of said direct-current power supply and the output voltage of said rectifying section as a power supply voltage applied to said driving means, said one of the output voltages being not lower than a minimum value necessary for operating the lateral MOSFET within a linearity region.

3. The micro power supply device according to claim 1, wherein said control section includes:

signal generating means for generating the switching control signal;

driving means for amplifying the switching control signal generated from said signal generating means and driving the lateral MOSFET; and selecting means for selecting a higher one of the output voltage of said direct-current power supply and the output voltage of said rectifying section as a power supply voltage applied to said driving means.

4. The micro power supply device according to claim 1, wherein said lateral MOSFET has a characteristic in which when an on-signal is supplied from said control means as a pulse width modulated signal, the on-resistance becomes lower than that of the lateral MOSFET through which a direct current flows within 30 nanoseconds.

5. The micro power supply device according to claim 1, wherein said control section includes means for PWM-controlling the lateral MOSFET at a switching frequency of 1 MHz or higher.

6. The micro power supply device according to claim 1, wherein said lateral MOSFET of said chopper section and said control section are formed on one chip.

7. The micro power supply device according to claim 1, wherein said chopper section includes a plurality of chopper circuits connected in cascade, and each of said plurality of chopper circuits includes the lateral MOSFET for switching an output voltage of a direct current power supply at a switching frequency of 1 MHz or higher and an on-resistance of 1 $\Omega/mm^2$ (ohm per unit area of one side of the lateral MOSFET) or lower, the rectifying element for rectifying the output voltage switched by the lateral MOSFET, and the inductance element provided in at least one of the lateral MOSFET and the rectifying element.

8. The micro power supply device according to claim 7, wherein said chopper section includes a resonant circuit connected between the chopper circuits.

9. The micro power supply device according to claim 1, wherein said rectifying element of said chopper section includes a charge pump circuit for increasing the output voltage of said rectifying element.

10. The micro power supply device according to claim 1, wherein said chopper section includes a step-up DC/DC converter.

11. The micro power supply device according to claim 1, wherein said chopper section includes a step-down DC/DC converter.

12. The micro power supply device according to claim 1, wherein said chopper section includes means for selectively activating a step-up DC/DC converter and a step-down DC/DC converter.

13. The micro power supply device according to claim 12, wherein said chopper section includes a control section having a control section of the step-up DC/DC converter and a control section of the step-down DC/DC converter which are integrally with each other.

14. A micro power supply device using a switching element comprising:

a lateral MOSFET for PWM-switching an output voltage of a direct-current power supply;

an inductor provided between said direct-current power supply and said lateral MOSFET;

a rectifying section for rectifying the output voltage PWM-switched by said lateral MOSFET;

a control section for supplying a PWM control signal to a gate electrode of said lateral MOSFET in response to an output voltage of said rectifying section; and selecting means for selectively supplying the output voltage of said direct-current power supply and the output voltage of said rectifying section to said control section as a power supply voltage of said control section.

15. The micro power supply device according to claim 14, wherein said selecting means includes means for selecting one of the output voltage of said direct-current power supply and the output voltage of said rectifying section as a power supply voltage applied to said control section, said one of both the output voltages being not lower than a minimum value necessary for operating the lateral MOSFET within a linearity region.

16. The micro power supply device according to claim 14, wherein said selecting means includes means for selecting a higher one of the output voltage of said direct-current power supply and the output voltage of said rectifying section as a power supply voltage applied to said control section.

* * * * *